United States Patent [19]

Petronio

[11] Patent Number: 5,127,213

[45] Date of Patent: Jul. 7, 1992

[54] TRAINING AND CONDITIONING APPAREL FOR ANIMALS

[76] Inventor: Mark Petronio, 495 Harding Ave., Lyndhurst, N.J. 07071

[21] Appl. No.: 709,321

[22] Filed: Jun. 3, 1991

[51] Int. Cl.$^5$ .......................... B68B 1/00; B68C 1/12
[52] U.S. Cl. ............................................. 54/71; 54/79
[58] Field of Search .................... 54/65, 66, 71, 79

[56] References Cited

U.S. PATENT DOCUMENTS

| | | | |
|---|---|---|---|
| 218,217 | 8/1879 | Benoit | 54/65 |
| 530,085 | 12/1894 | Bustin | 54/79 X |
| 530,864 | 12/1894 | Torrey | 54/66 |
| 4,955,182 | 9/1990 | Newman | 54/79 |
| 4,974,398 | 12/1990 | Kaski | 54/71 |

Primary Examiner—Robert P. Swiatek
Attorney, Agent, or Firm—Anthony F. Cuoco

[57] ABSTRACT

A blanket-type member supports weights in either a fixed or variable relation and is disposed on the back of an animal for training and conditioning purposes. The blanket-type member has a cushioned undersurface for the comfort of the animal and is disposed on the animal's back over an undercover to prevent chafing and the like as the animal moves about with the blanket-type member on its back.

9 Claims, 2 Drawing Sheets

TRAINING AND CONDITIONING APPAREL FOR ANIMALS

Animals, and particularly horses, are trained and conditioned to improve their physical characteristics as well as their body conformation. Some animals are trained at an early stage in their life so that they can accomplish particular tasks. Thus, a horse may be trained for jumping, weight carrying capacity, running speed, stamina, lung capacity and pulling strength, as is the case for harness horses. Show horses may be trained for muscular and body conformation so as to increase their value for the purposes described. It is well recognized that this training and conditioning can be accomplished through the use of weights carried by the animal.

Horse training and conditioning has become a widely adapted and sophisticated endeavor. In this regard, reference is made to the publication *Equus* 163 published by Fleet Street Publishing Corp, Gaithersburg, Md., and an article in the May, 1991 issue thereof at page 59, et seq. by Laura Hillenbrand entitled "The Equine Athlete: How Much Can He Improve?".

Prior to the present invention, training and conditioning apparel for animals for accomplishing the purposes described has not been available and other means had to be used. For example, in order to increase the lung capacity and stamina of a horse, the horse has heretofore been harnessed to a weight and has been directed to pull the weight at increasing speeds. This is obviously an uncontrolled way of training and conditioning the animal and, indeed, can work to the animal's disadvantage.

The applicant is aware of several patents featuring weighted garments which are used by humans for training and conditioning purposes.

U.S. Pat. No. 4,268,917 which issued on May 26, 1981 to Massey (U.S. Class 2/102) relates to a variable weighted vest for use in exercising, such as jogging, skating, bicycling and horseback riding.

U.S. Pat. No. 4,344,620 which issued on Aug. 17, 1982 to Debski (U.S. Class 272/119) relates to an exercise vest which has interconnected watertight compartments which define a vest for supporting a fluid weight medium from the shoulders and about the upper torso of a human exerciser.

U.S. Pat. No. 4,382,302 which issued on May 10, 1983 to Watson (U.S. Class 2/102) relates to a weighted training vest having constant weight distribution. The vest is adapted to be worn upon an athlete's torso to develop greater strength for running, and for this purpose includes front and rear flexible panels adapted to fit against the wearer's chest and back, respectively, and a plurality of weights adapted to be affixed to the panels selectively and individually in a predetermined pattern to accomplish the purposes of the invention.

U.S. Pat. No. 4,394,012 which issued on Jul. 19, 1983 to Egbert (U.S. Class 272/119) relates to a weighted exercise vest that selectively allows weight capsules to be inserted into vest pockets. The vest is designed to allow free movement of the arms and is adapted to be worn while participating in conventional athletic activities, such as volleyball, basketball, racquetball, tennis and the like.

U.S. Pat. No. 4,602,387 which issued on Jul. 29, 1986 to Zakrsewski relates to a weight vest incorporating means for wearing an adjustable amount of weight for purposes of weight resistance training.

All of the aforenoted prior art is adapted to fit the human torso. That is to say, the prior art teaches essentially vest-type garments with neck and arm openings and, in this respect, differs from the configuration of the present invention, as will be discerned from the description thereof to follow.

SUMMARY OF THE INVENTION

This invention relates to training and conditioning apparel for animals including a blanket-type member supporting a plurality of weights. The blanket-type member is adapted to be disposed on the back of the animal and includes straps which fasten said member underneath the animal's belly. In one embodiment of the invention, the blanket-type member has a plurality of weights fixedly supported thereby. In another embodiment of the invention, the weights are removably supported by the blanket-type member so that the weight carried by the animal for training and conditioning purposes is variable. The underside of the blanket-type member is cushioned for the comfort of the animal. In a preferred embodiment of the invention, the apparel includes an undercover to prevent chafing and the like as the animal moves with the blanket-type member on its back. With the arrangement described, the blanket-type member is adjustably disposed on the animal's back so as to accommodate particular muscle groups and, in the case of a horse, to accommodate a saddle for a rider, as the case may be.

DETAILED DESCRIPTION OF THE INVENTION

Figure 1:
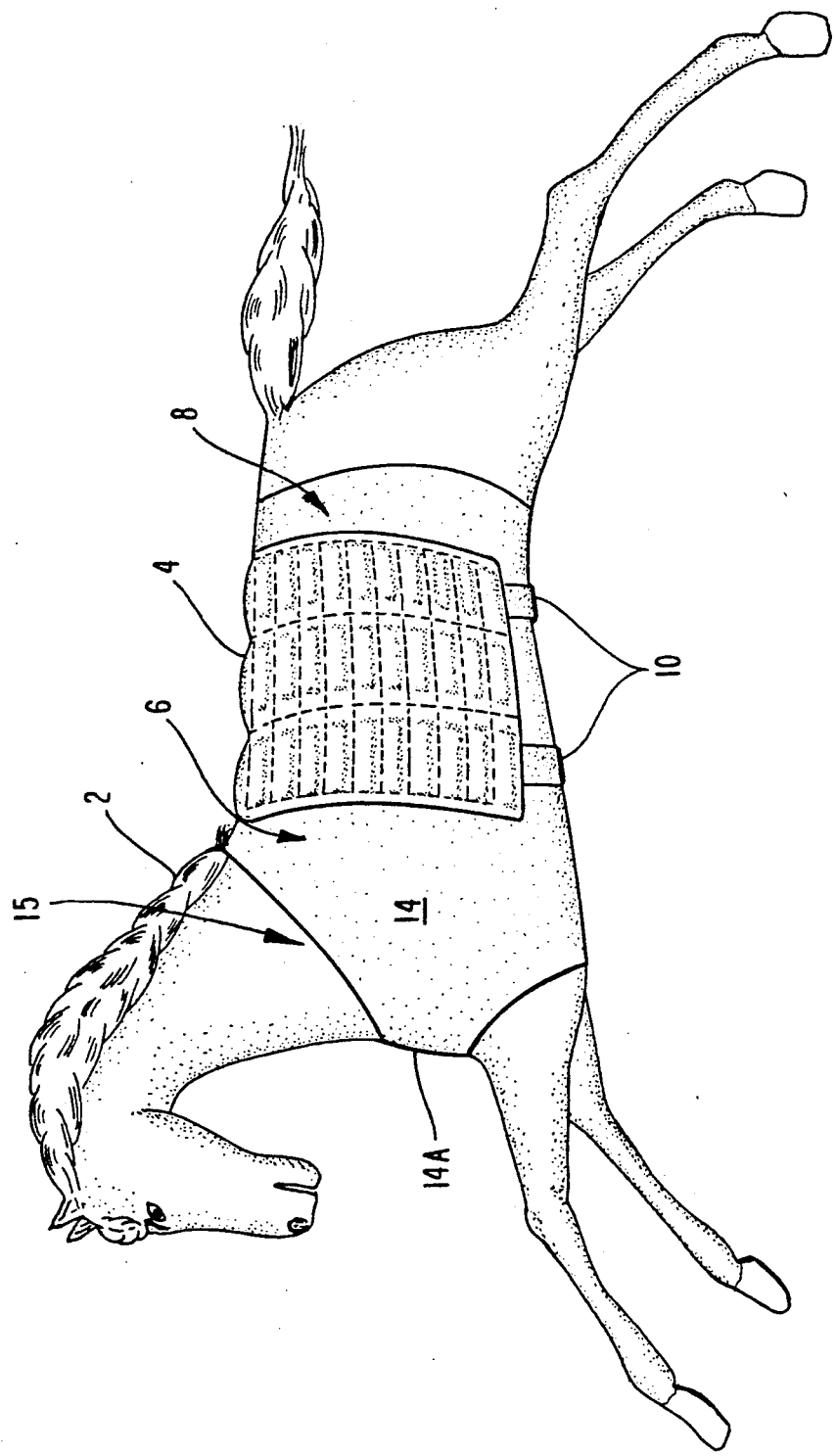
FIG. 1 is a pictorial representation generally illustrating the invention.

With reference to FIG. 1, an animal, which is shown for illustration purposes as a horse, is designated by the numeral 2. In this regard, it will be understood that although the invention will be described as being applicable for use with a horse, it is applicable for use with other animals as well. For example, the animal training and conditioning apparel to be herein described may be adapted for use with show or racing dogs, as will be readily understood.

The training and conditioning apparel of the invention includes a blanket 4. Blanket 4 is weighted as will be hereinafter more particularly described with reference to FIGS. 2-4. Blanket 4 is disposed on the back of horse 2 and extends generally in length between the withers area 6 and the hip area 8 of the horse. The blanket covers the rib, loin and flank areas of the horse and is securely fastened to the horse by straps 10 which meet on the underside of the horse's belly. The fastening is accomplished, for example, by commonly used fabric hook and loop fasteners 18 and 20 illustrated in FIGS. 2 and 4, as are well known is the art.

Figure 3:
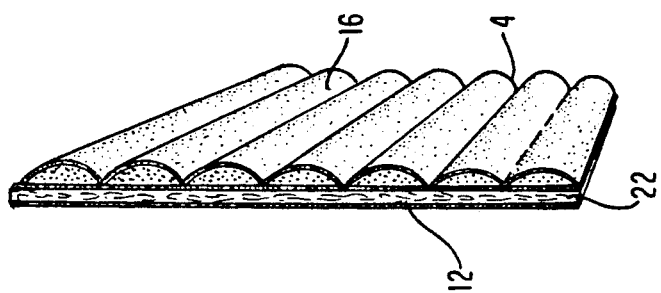
FIG. 3 is a sectional view taken along line 3-3 in FIG. 2.

Blanket 4 may vary in length and may be adjustably positioned on the back of horse 2 depending on a desired training and conditioning protocol, as will be understood. Blanket 4 has a cushioned undersurface 12 as illustrated in FIG. 3 for the comfort of the horse, as will be appreciated.

In a preferred embodiment of the invention, blanket 4 is disposed over a suitable undercover 14. Undercover 14 prevents chafing and the like as the horse moves about with blanket 4 on its back. As shown in FIG. 1, undercover 14 is a leotard-type garment and fits around the body of the horse from near the shoulder area 15 and extends in length rearwardly therefrom to near hip area 8. The undercover may be fastened at its front 14A by a suitable fastener, such as the aforementioned fabric loop and hook fastener (not shown), and may include a strap or the like (not shown) extending on its underside from the front to back so as to secure the undercover on the horse. In this regard, it is noted that undercovers of the type described are commercially available under the trade designation W'UNDERCOVER marketed by W'Undercover for Equines, a division of New Tech Enterprises, Inc., Chester Springs, Pa. Undercover 14 may cover a significant portion of the torso of horse 2, as shown in FIG. 1, to accommodate a wide range of length and adjustability of blanket 4 on the back of the horse, or may cover a lesser portion of the horse's torso, depending on the actual desired position of blanket 4.

Figure 2:
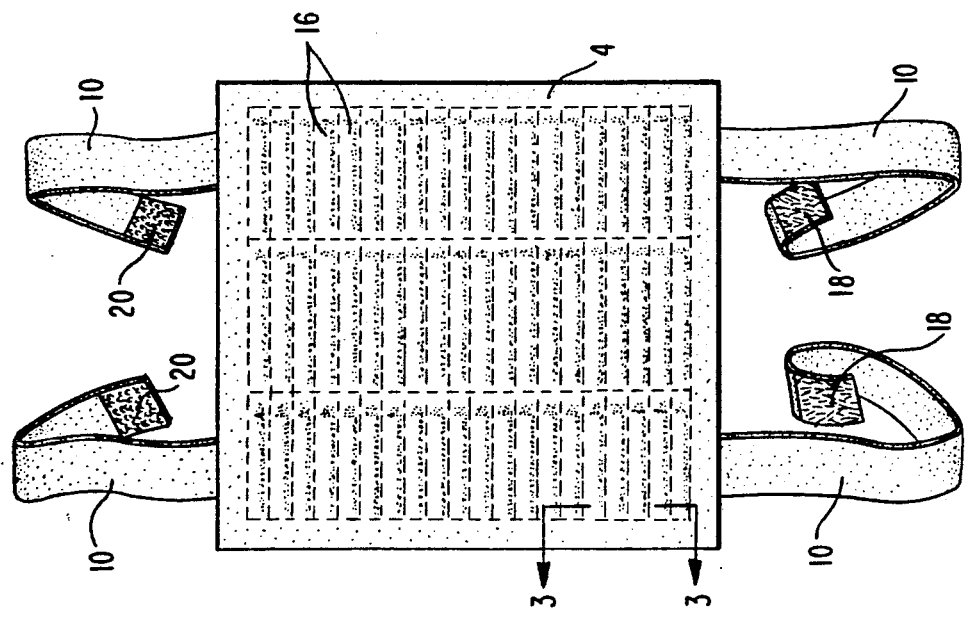
FIG. 2 is a plan view illustrating one embodiment of the invention.

With reference to FIG. 2, one embodiment of blanket 4 is illustrated. Thus, the blanket includes a plurality of closed compartments such as 16. Compartments 16 may contain pebbles, sand, small stones or even coins to provide desired weighting characteristics. Although compartments 16 are shown disposed in an aligned configuration, this need not necessarily be the case, depending on the intended use of the invention. Straps 10 extend from opposite ends of blanket 4 on both sides thereof and include the aforenoted loop 18 and pile 20 fasteners for the purposes aforenoted.

Blanket 4 is preferably of a suitable water resistent canvas material and compartments 16 are made watertight, as by sewing or the like to best serve the purposes of the invention.

With reference to FIG. 3, underside 12 of blanket 4 has a suitable cushioning member 22 secured thereto. Cushioning member 22 may be likewise of canvas and stuffed, for example, with wool so as to provide a degree of comfort when blanket 4 is disposed on the horse's back. Cushion member 22 is secured to underside 12 of blanket 4 as by sewing or the like.

In the embodiment of the invention illustrated in FIGS. 2 and 3, blanket 4 carries a constant weight. This weight may vary, depending on the training and conditioning factors to be considered, but once the blanket is fabricated, the weight cannot be varied, as will now be recognized.

Figure 4:
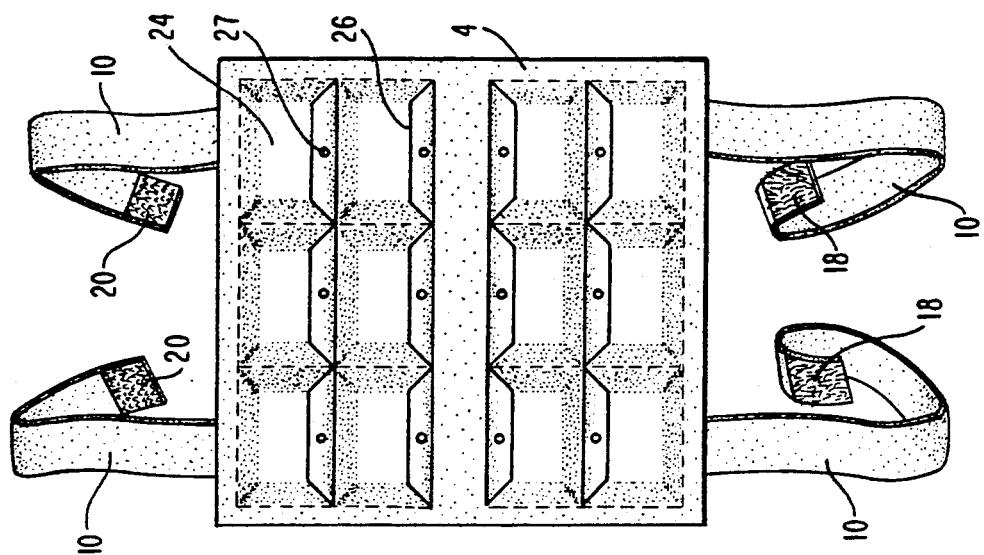
FIG. 4 is a plan view illustrating with another embodiment of the invention.

With reference to FIG. 4, another embodiment of the invention is illustrated, wherein blanket 4 carries a plurality of weights disposed in a plurality of pockets 24. Pockets 24 are closed by flaps 26 via snap or loop and pile fasteners 27, or other like means well known in the art. The pockets carry weighting members, such as the aforenoted sand, pebbles, coins, or preferably solid bars of metal or the like. It will be recognized that in the embodiment of the invention shown in FIG. 4, the amount of weight can be varied by removing sufficient weights from pockets 24 to accommodate varying training or conditioning circumstances for horse 2. Thus, at the beginning of a training and conditioning protocol, only several of the pockets may contain weights, and weights may be gradually added to the other pockets as training and conditioning progresses.

There has thus been described training apparel for animals which is useful in training and conditioning the animals for various purposes. The apparel described is versatile as is desireable. For example, and with reference to FIG. 1, it may be desireable to place a saddle on horse 2 so that the horse may be ridden during a training and conditioning protocol. In this event, the length of blanket 4 can be decreased so as to cover only the rearward portion of the horse with the saddle being disposed in the front thereof. Likewise, if the front of the horse needs to be conditioned, the covering portion of the blanket may be directed forwardly to accomplish same. Undercover 14 may be sized in accordance with the size of blanket 4.

With the above description of the invention in mind, reference is made to the claims appended hereto for a definition of the scope of the invention.

What is claimed is:

1. Training and conditioning apparel for animals, comprising:

a leotard-like undergarment fitting around the body of an animal;

a blanket-type member positioned on the back of the animal over the undergarment, said blanket-type member positioned on the back of the animal and extending in length in accordance with a desired training and conditioning protocol for the animal; and means for weighting the blanket-like member including a plurality of compartments disposed in a selected pattern in said blanket-like member, and said compartments being arranged for carrying weights, at least two of said compartments being disposed so as to extend from the front to the rear of the blanket-like member and along a common longitudinal axis of said at least two compartments with the aggregate of the carried weights being effective for weighting the blanket-like member in accordance with the desired training and conditioning protocol.

2. Apparel as described by claim 1, wherein:

the blanket-type member has a cushioned undersurface.

3. Apparel as described by claim 2, including:

straps extending from opposite ends of the blanket-like member on both sides thereof; and means arranged with the straps so that the ends of corresponding straps on the opposite ends of the blanket-like member meet and are fastened on the underside of the animal's belly,, whereby the blanket-like member is securely positioned on the animal's back over the undergarment in accordance with the desired training and conditioning protocol.

4. Apparel as described by claim 3, including:

a plurality of closed compartments in the blanket-like member; and the plurality of closed compartments carrying weights for fixedly weighting the blanket-like member in accordance with the desired protocol.

5. Apparel as described by claim 3, including:

the plurality of compartments in the blanket-like member arranged for being opened and closed to accommodate weights added and removed therefrom for variably weighting the blanket-like member in accordance with the desired protocol.

6. Apparel as described by claim 1, including:

straps extending from opposite ends of the blanket-like member on both sides thereof; and means arranged with the straps so that the ends of corresponding straps on the opposite ends of the blanket-like member meet and are fastened on the underside of the animal's belly, whereby the blanket-like member is securely positioned on the animal's back over the undergarment in accordance with the desired training and conditioning protocol.

7. Apparel as described by claim 1, wherein:

the plurality of compartments in the blanket-like member are closed; and the closed compartments carrying weights for fixedly weighting the blanket-like member in accordance with the desired protocol.

8. Apparel as described by claim 1, wherein the plurality of compartments in the blanket-like member are arranged to be opened and closed to accommodate weights added and removed therefrom for variably weighting the blanket-like member in accordance with the desired protocol.

9. Apparel as described by claim 1, wherein:

the leotard-like undergarment fits around the body of the animal at near the shoulder area of the animal and extends in length rearwardly therefrom to near the hip area; and the blanket-type member positioned on the back of the animal extends in length generally between the withers and hip areas of the animal.

* * * * *